United States Patent
Harrison

(10) Patent No.: US 7,295,655 B2
(45) Date of Patent: Nov. 13, 2007

(54) SYSTEMS AND METHODS FOR DETERMINING THE STATUS OF TELEPHONE LINES

(75) Inventor: Charles R. Harrison, Falcon, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 10/672,819

(22) Filed: Sep. 26, 2003

(65) Prior Publication Data

US 2005/0069093 A1 Mar. 31, 2005

(51) Int. Cl.
*H04M 1/24* (2006.01)
*H04M 3/08* (2006.01)
*H04M 3/22* (2006.01)

(52) U.S. Cl. .............. 379/27.01; 379/1.01; 379/22.03; 379/29.01; 379/29.11

(58) Field of Classification Search .............. 379/1.01, 379/21, 22, 23, 24, 26.01, 26.02, 27.01, 27.07, 379/29.01, 29.04, 29.1, 29.11, 31
See application file for complete search history.

(56) References Cited

U.S. PATENT DOCUMENTS

| | | | |
|---|---|---|---|
| 3,951,248 A | | 4/1976 | Feiner et al. |
| 3,976,849 A | | 8/1976 | Champan |
| 4,002,861 A | | 1/1977 | Putt |
| 4,373,120 A | | 2/1983 | McDonald |
| 4,513,176 A | | 4/1985 | Fostveit |
| 4,544,807 A | | 10/1985 | Sers |
| 4,564,728 A | * | 1/1986 | Romano ................... 379/21 |
| 4,588,862 A | | 5/1986 | Grabowg |
| 4,600,810 A | | 7/1986 | Feldman et al. |
| 4,796,289 A | * | 1/1989 | Masor .................. 379/27.07 |
| 4,827,498 A | | 5/1989 | Ross |
| 4,841,559 A | | 6/1989 | Curtis |
| 4,945,555 A | | 7/1990 | Teumer et al. |
| 4,969,179 A | | 11/1990 | Kanare et al. |
| 5,062,131 A | | 10/1991 | Kanare et al. |
| 5,353,327 A | * | 10/1994 | Adari et al. .................. 379/22 |
| 5,671,273 A | * | 9/1997 | Lanquist ................ 379/413.04 |
| 5,696,810 A | * | 12/1997 | Dunn ..................... 379/32.01 |
| 5,887,051 A | * | 3/1999 | Sullivan et al. ............... 379/21 |
| 5,960,060 A | * | 9/1999 | Kaibel ........................ 379/21 |
| 6,904,130 B2 | * | 6/2005 | Urban et al. ............. 379/26.01 |

OTHER PUBLICATIONS

Telephone Directory, Questdex.com, Phone Service Page No. 17, no date.
Radio Shack, http://www.radioshack.com/productasp?,, Sep. 18, 2003, 2 pages.

* cited by examiner

*Primary Examiner*—Quoc Tran
(74) *Attorney, Agent, or Firm*—Townsend and Townsend and Crew LLP

(57) ABSTRACT

Systems and methods for detecting a status of a telephone line. Some of the systems include a telecommunications system which comprises a dial tone tester integrated with a demarcation device. Such dial tone testers can include a visual device or an audible device indicative of line status. Various methods are also described for detecting the status of a telephone line. Such methods can include receiving a response originating from a customer premises, viewing a demarcation device located at the customer premises, and determining line status from a dial tone tester integrated with the demarcation device.

13 Claims, 7 Drawing Sheets

SYSTEMS AND METHODS FOR DETERMINING THE STATUS OF TELEPHONE LINES

BACKGROUND OF THE INVENTION

The present invention is related to telecommunications networks. More particularly, the present invention relates to systems and methods for determining the status of a telephone line.

Currently, a customer must determine the source of a problem with a telephone set or a telephone line. The customer may detect a phone line error on the premises and must determine whether the error is within the wiring, the telephone set, or the telecommunications network bringing the signal to/from the customer premises. In some cases, this testing has included phone line testers. For example, a typical plug in phone line tester can be purchased from Radio Shack®, e.g. Phone Line Tester (catalog #43-2225). This plug in phone line tester tests the status of the phone line and denotes any problems with modular phone jacks and phone line wiring. The customer must purchase the phone line tester and test the status of the phone line. These prior processes are a burden to the customer because they include a number of steps and may result in misdiagnosis of the problem. In some cases, the misdiagnosis results in an unnecessary service call when the problem does not originate from the telephone company.

Typically, a telephone company is responsible for any problems that occur upstream of a network interface box located at a customer premises. However, a customer is typically responsible for any problems that occur downstream of the network interface box. Therefore, it would be beneficial for the customer to know where the failure is occurring before making an expensive and unnecessary service call to the telephone company.

Thus, there exists a need in the art for systems and methods that address the aforementioned problems, as well as other limitations of the existing art.

BRIEF SUMMARY OF THE INVENTION

Embodiments of the present invention are directed to systems and methods for more efficiently determining the status of a telephone line. In accordance with one embodiment of the present invention, a system for determining the status of a phone line is provided. The system comprises a dial tone tester integrated with a demarcation device.

The present invention can lift the burden of a customer testing line status at a customer premises. In many cases, the customer will not have to purchase a separate dial tone tester. Furthermore, the present invention can save the customer time and money because once the customer has determined that the failure of the phone line is due to a problem within the customer premises, the customer does not need to make an expensive and unnecessary inquiry with the telecommunications company.

In some embodiments of the present invention, a dial tone tester comprises a visual device and a voltage dividing circuit. The visual device of the dial tone tester visually indicates a threshold signal level present on a telephone line at the demarcation device. If the detected voltage is adequate for the proper operation of customer premises equipment, the visual device is activated. Alternatively, if the detected voltage is inadequate, then the visual device is deactivated. One of ordinary skill in the art will recognize that the opposite can also be implemented where activation indicates a failure. In a typical telephone system, a voltage greater than or equal to forty-four volts is adequate, while a lesser voltage is inadequate.

At the location of the demarcation device, the dial tone tester is capable of testing both an upstream signal level from the central office via a CLEC/ILEC, and a downstream signal level (e.g., the signal level within the customer premises). Based on this testing, a visual, audible, or some other indication can be provided from the dial tone tester indicating the status of the signal level. As previously discussed, a failure in the upstream signal is typically the responsibility of the telephone company, while a failure of the downstream signal is typically the responsibility of the customer.

In other embodiments, a demarcation device including an integrated dial tone tester comprises an integrated circuit that accepts upstream voltage and provides downstream voltage. In some cases, the integrated circuit is an optical isolator circuit. Further, in some embodiments, the demarcation device is mounted on an external wall of a customer premises, and as such is easily accessed by the customer. Upon detecting a failure, such as the lack of a dial tone, the customer can unplug one or more customer premises equipment. After unplugging this equipment, the customer can determine the line status by monitoring the dial tone tester. Thus, for example, where the dial tone tester indicates a failure prior to unplugging a customer premises equipment, but indicates a normal status after unplugging such equipment, it can be determined that a failure exists at the equipment and not in the upstream signal. Based on this, the customer does not need to call the telecommunications company for an expensive and unnecessary service call.

Yet other embodiments provide methods for detecting telephone line status within a customer premises. Such methods can include receiving a response originating from a customer premises, receiving information about the status of the dial tone tester integrated with the demarcation device at the customer premises, and based on such information, telling a customer what course to proceed to correct the error in service.

This summary provides only a general outline of the embodiments according to the present invention. Many other objects, features, and advantages of the present invention will become more fully apparent from the following detailed description, the appended claims, and the accompanying drawings.

BRIEF DESCRIPTION OF THE DRAWINGS

A further understanding of the nature and advantages of the present invention may be realized by reference to the figures which are described in the remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Among other things, the present invention provides systems and methods for detecting status of a telephone line. There are numerous configurations for implementing the present invention.

Figure 1A:
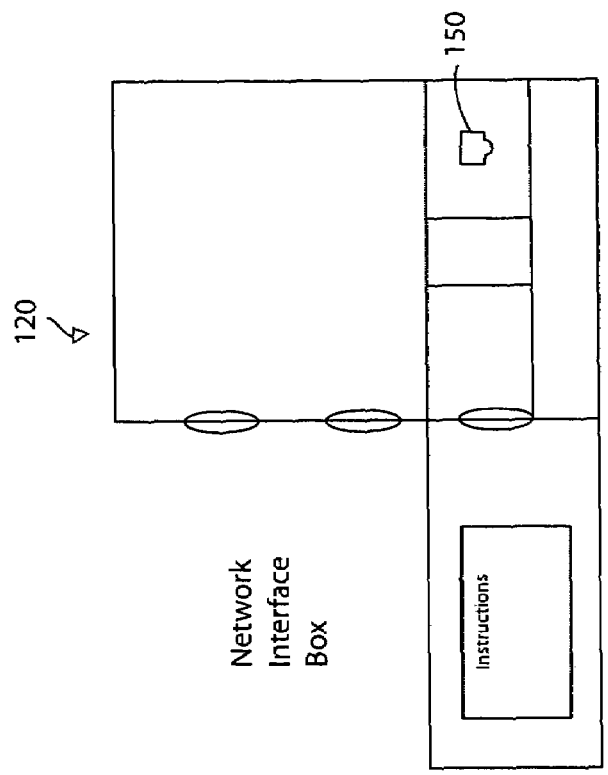
FIG. 1 illustrate representative diagrams of a prior art telecommunications network including a terminal, a network interface box, and a jack.
Figure 1B:
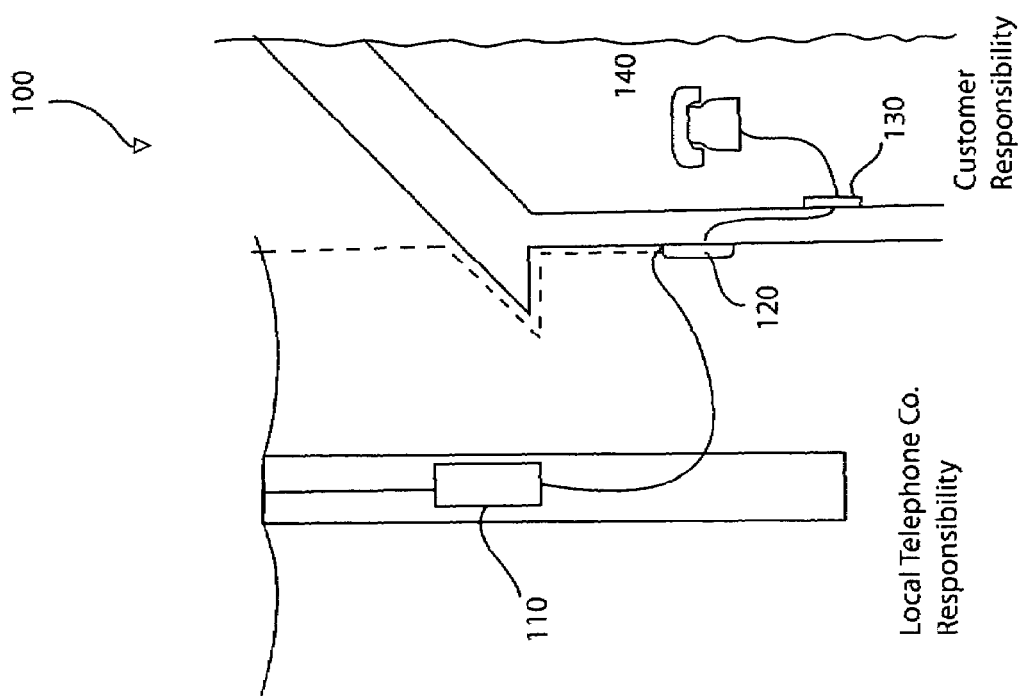

FIG. 1 illustrate representative diagrams of a prior art telecommunications network 100 including a terminal 110, a network interface box 120, a jack 130, and a telephone set 140. In the prior art, the customer must purchase a phone line tester and test the status of the phone line. Alternatively, the customer must unplug all customer premises equipment, and plug one of the customer premises equipment directly into a network interface jack located at network interface box 120. These prior processes are a burden to the customer because they include a number of steps and may result in misdiagnosis of the problem.

In a typical scenario, a customer fails to implement the various steps resulting in a misdiagnosis. Subsequently, the customer calls the telephone company that in some cases must answer every customer call by sending a service technician to the customer premises. Where a misdiagnosis has occurred, the service call by the service technician results in a costly waste of effort. In one case, the average service technician gets approximately six service calls per day, with approximately half of these calls being unnecessary because of a misdiagnosis. In such cases, the problem turns out to be the responsibility of the customer with the failure being caused downstream, rather than upstream of network interface box 120. Where each service call costs the telephone company approximately two hundred dollars, and the maximum that can be recouped from the customer is less that half of that (as regulated by the Federal Communications Commission), the telephone company loses significant amounts of money due to errant service calls. This problem has existed for a long time, yet this expensive burden on telephone companies has remained unresolved.

Figure 2:
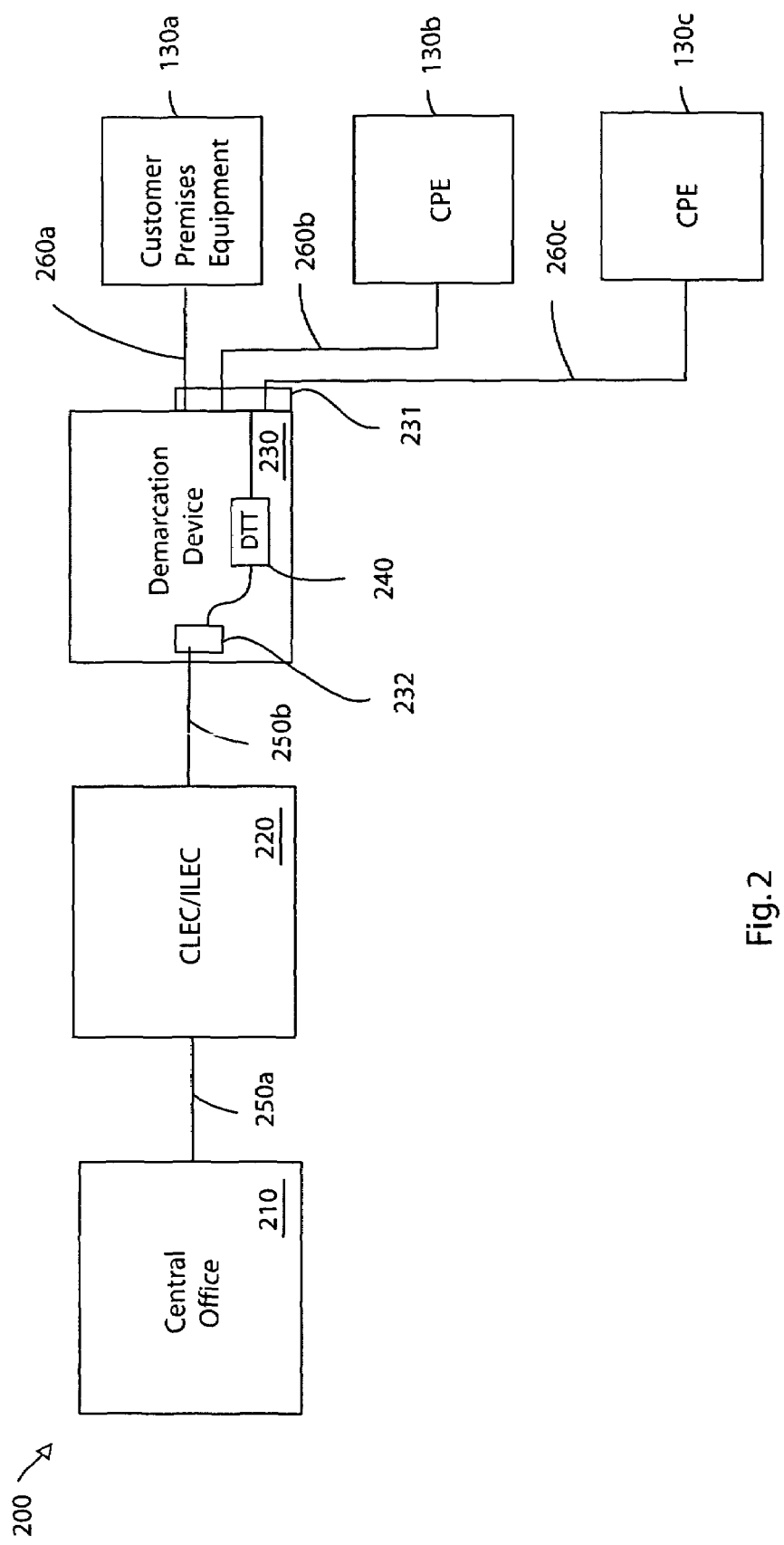
FIG. 2 is a block diagram of a telecommunications network in accordance with some embodiments of the present invention.

FIG. 2 is a block diagram of a telecommunications network 200 in accordance with some embodiments of the present invention. Telecommunications network 200 includes a central office 210, a CLEC/ILEC 220, a customer premises equipment 130, and demarcation device 230 including an integrated dial tone tester 240. Such an integrated dial tone tester 240 could be formed in a three quarter inch by two inch area in demarcation device 230. As illustrated, central office 210 is coupled to CLEC/ILEC 220 by one or more communication lines 250a, and CLEC/ILEC 220 is coupled to demarcation device 230 by a communication line 250b at a connection point 232. Communication lines 250 comprise outside wiring.

Figure 3:
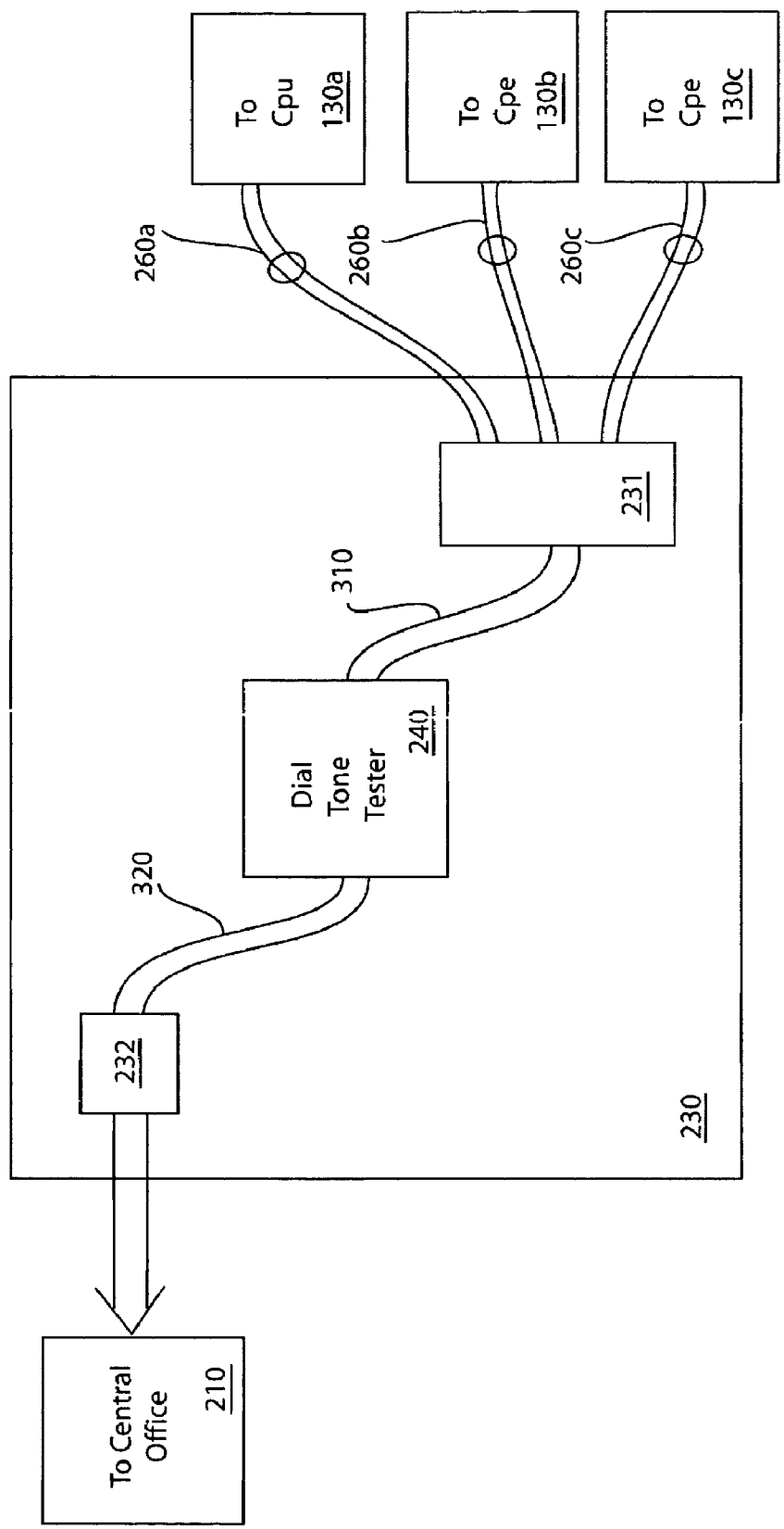
FIG. 3 illustrates an exemplary embodiment of a demarcation device integrated with a dial tone tester in accordance with some embodiments of the present invention.

As further illustrated in FIG. 3, communication lines connect dial tone tester 240 to another connection point 231. Connection point provides multiple inside wiring 260 connecting to multiple customer premises equipment 130. In some cases, more than one customer premises equipment 130 is connected to a given inside wiring, while in other cases, each customer premises equipment 130 is connected to a dedicated inside wiring 260. In one particular case, only one inside wiring 260 is provided, with a number of customer premises equipment 130 attached to the single provided inside wiring. Based on this disclosure, one of ordinary skill in the art will recognize a number of other connections that are possible.

Central office 210 is conventional and mostly comprises switches, cable distribution frames, loops, converter, and/or the like. Customer premises equipment 130 is also conventional and mostly comprises telephones, modems, and/or the like.

Telecommunications system 200 including the demarcation device 230 with integrated dial tone tester 240 can be implemented to allow the customer to detect the status of the telephone line with ease. Such ease of use reduces the amount of misdiagnosis currently scene. Dial tone tester 240 can be used to detect whether a failure is upstream or downstream from demarcation device 230 without the number of steps and/or processes currently required. This reduces the complexity of system testing, leading to a reduction in the number of misdiagnosis. If the customer realizes the problem is occurring downstream, then the customer does not have to make a service call to the telephone company, but rather may fix the problem themselves or find another service technician other than that provided by a telephone company.

Referring now to FIG. 3, a more detailed drawing of dial tone tester 240 integrated with demarcation device 230 is provided. As illustrated, demarcation device 230 is communicably coupled to central office 210 and customer premises equipment 130. Dial tone tester 240 is integrated with demarcation device 230. In some cases, this integration can include a connection of wiring 320 passing through dial tone tester 240 and emerging as wiring 310.

Figure 4:
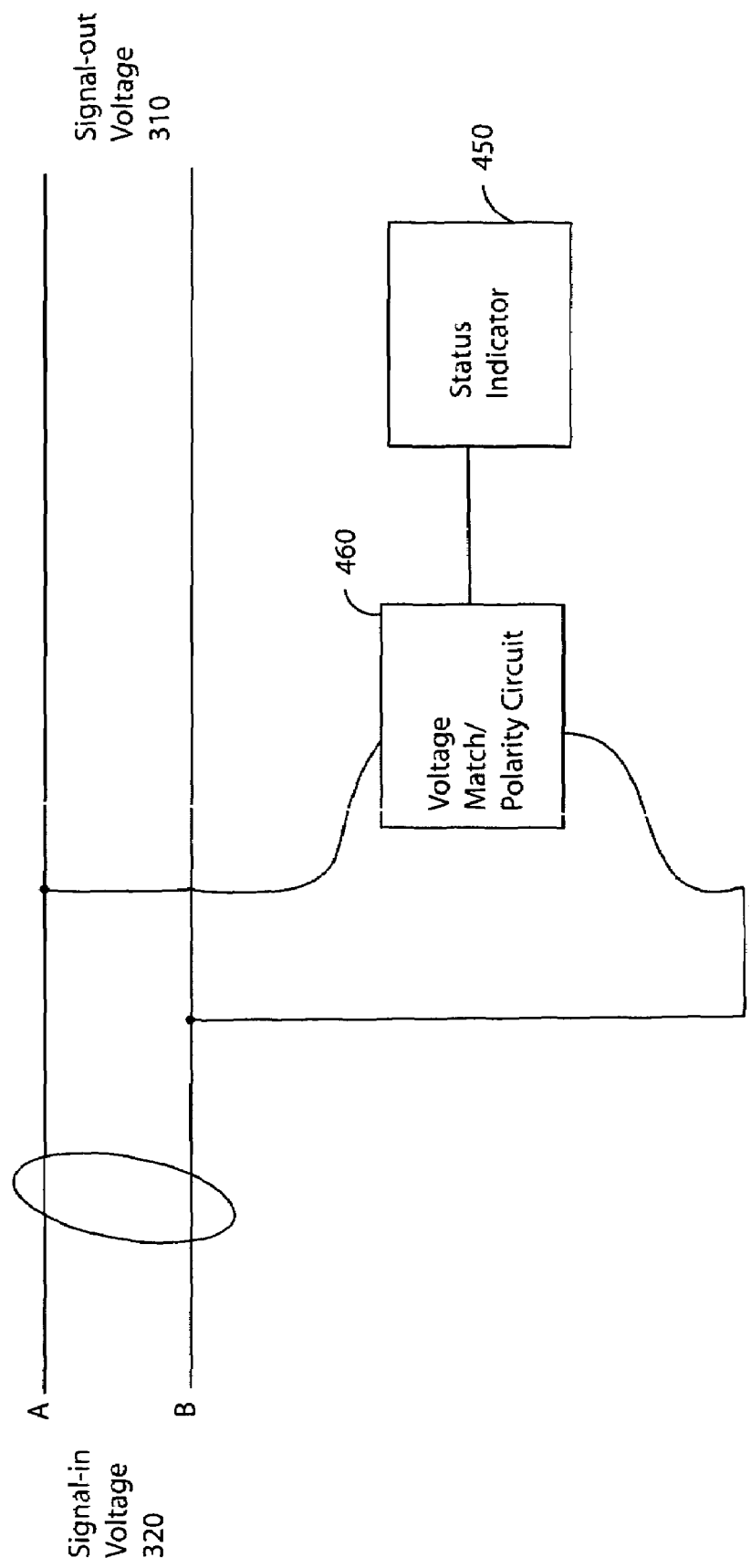
FIG. 4 is a schematic of an exemplary dial tone tester integrated with the demarcation device in accordance with some embodiments of the present invention.

Referring now to FIG. 4, a simplified exemplary schematic of dial tone tester 240 is illustrated. Dial tone tester 240 can include a visual, audible, and/or some other form of status indicator 450. In some cases, this is a visual indicator, in other cases this is an audio indicator, while in yet other cases this is a combination audio/visual indicator. Such a status indicator 450 can include one or more LEDs indicating status. Two or more LEDs can be used to indicate status based on different line polarities. In this way, a reversed polarity on the signal lines can be detected. Said another way, when the signal lines carry a signal with one polarity, one of the visual indicators is activated, and when the signal lines carry a signal of opposite polarity, the other of the visual indicators is activated.

Further, dial tone tester 240 can include a voltage match/polarity circuit 460. Circuit 460 can thus include one or both of a voltage divider circuit to match line voltages with status indicator 450, and/or a polarity control circuit to match line polarity with status indicator 450. Based on the disclosure provided herein, one of ordinary skill in the art will appreciate a number of dial tone tester circuits that can be used in relation to the present invention. As just one other example, U.S. Pat. No. 5,062,131 describes another circuit that can be used in relation to embodiments of the present invention.

Figure 5A:
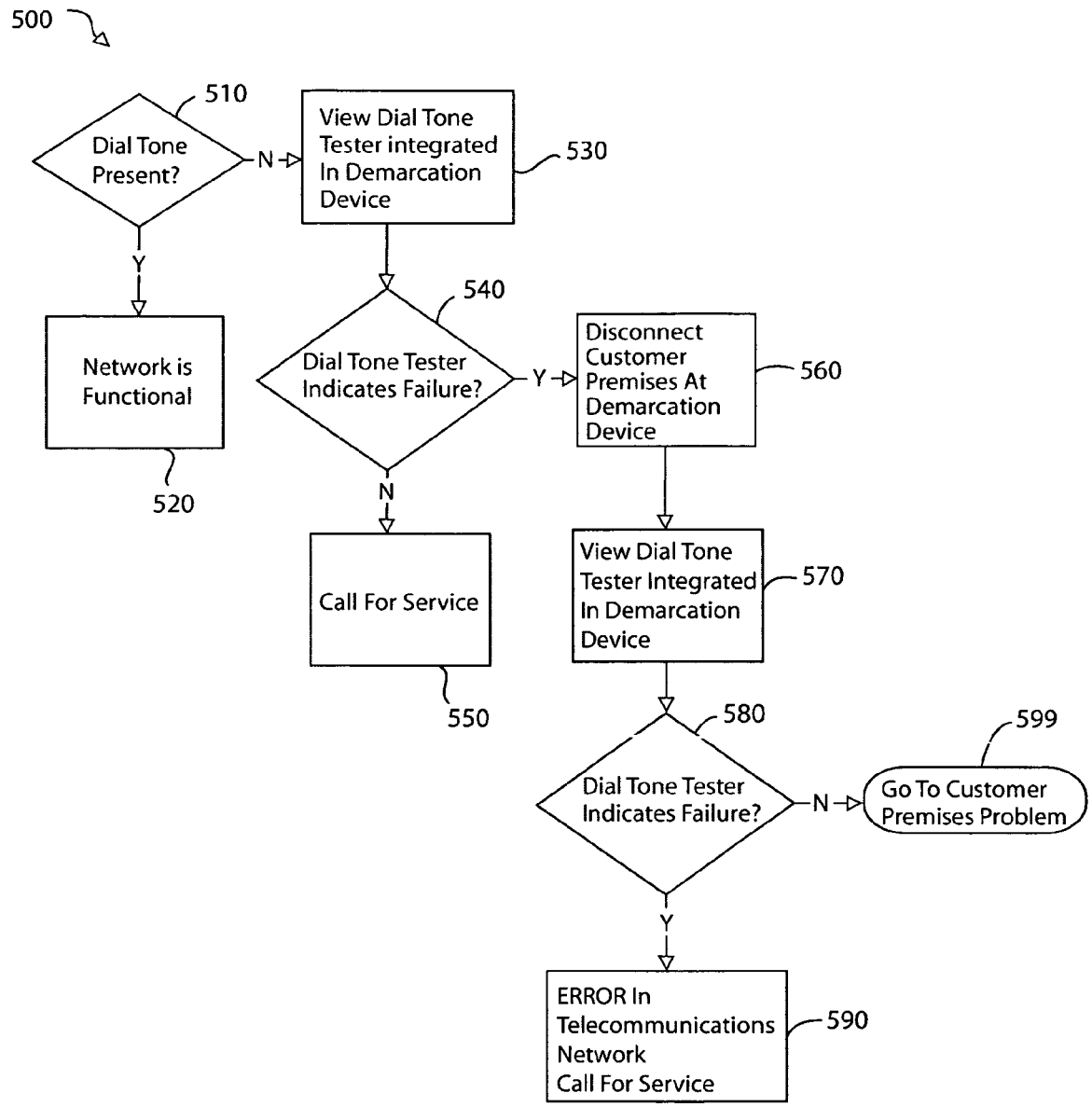
FIG. 5 are flow diagrams of a method for detecting line status in accordance with some embodiments of the present invention.

FIG. 5a is a flow diagram 500 illustrating a method for detecting line status in accordance with some embodiments of the present invention. Following flow diagram 500, a user determines whether a dial tone is present (block 510). Where a dial tone is present, the network is functional and the user may proceed to place a call (block 520). Alternatively, where no dial tone is present (block 510), the user can view the dial tone tester integrated in the demarcation device (block 530). Where the dial tone tester does not indicate a failure (block 540), an error status is indicated and service is called (block 550).

Alternatively, where the dial tone tester does indicate a failure (block 540), the user can disconnect wiring 310 from connection point 231 (block 560). The user can then view the dial tone tester integrated in the demarcation device (block 570). Where the dial tone tester indicates a failure (block 580), a network error is indicated and the user calls for service (block 590). Alternatively, where the dial tone tester does not indicate a failure (block 580), an error in the customer premises is indicated (block 599).

Figure 5B:
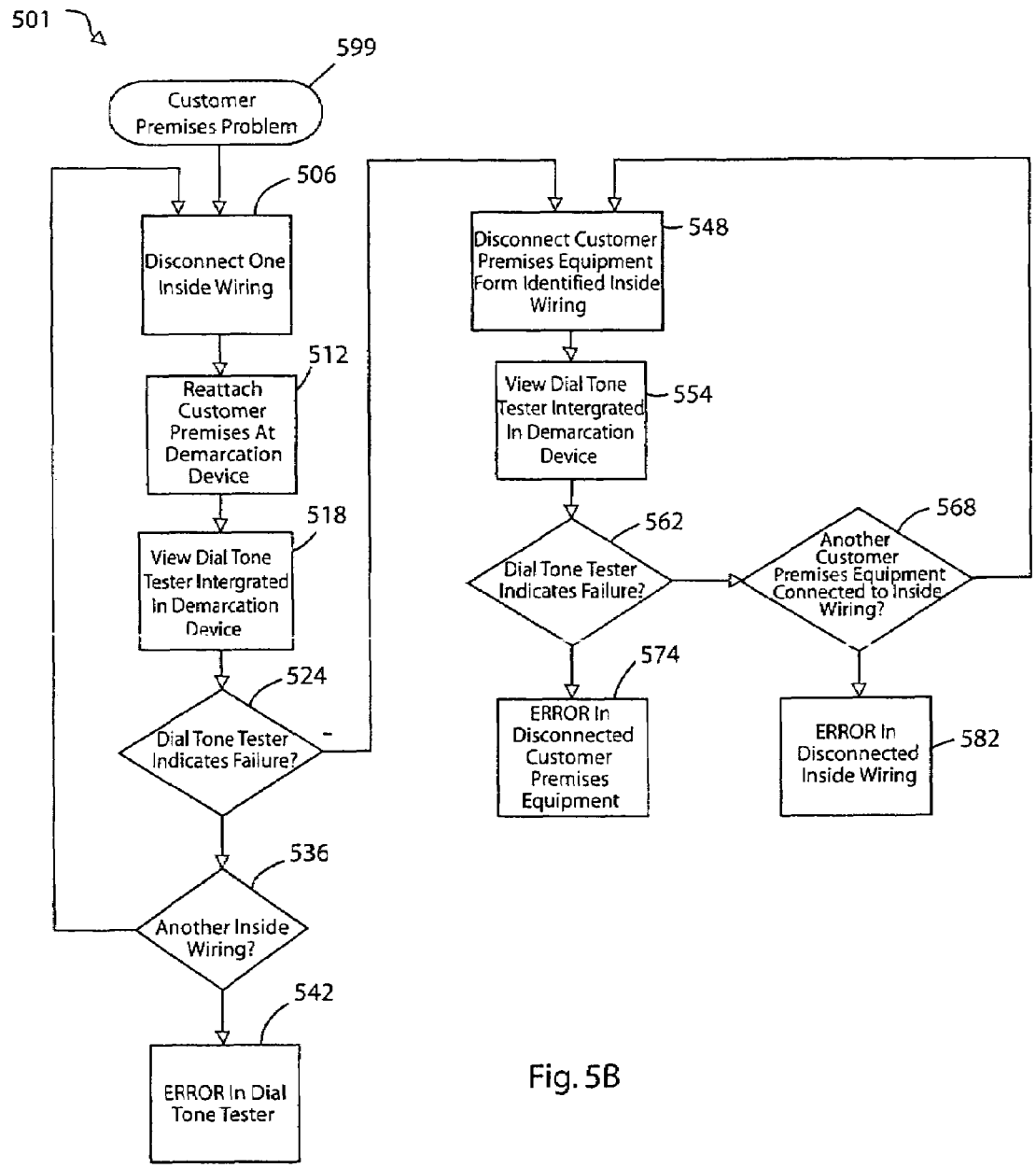

Turning to FIG. 5*b*, a flow diagram 501 illustrates a process for debugging a customer premises. Following flow diagram 501, a user disconnects one inside wiring 260 from connection point 231 (block 506), and reattaches wiring 310 to connection point 231 (block 512). The user can then view the dial tone tester integrated in the demarcation device (block 518). Where the dial tone tester indicates a failure (block 524), another of the inside wiring is failing. Where there is another inside wiring (block 536) blocks 506 through 524 are repeated. Where no other inside wiring exists (block 536) and a failure is still indicated (block 524), an error is most likely occurring in the dial tone tester and service is called (block 542).

Where no error is indicated after an inside wiring is disconnected (block 524), the identified inside wiring is reconnected and a customer premises equipment connected to the identified inside wiring is disconnected (block 548). The user can then view the dial tone tester integrated in the demarcation device (block 554). Where the dial tone tester indicates a failure (block 562), it is determined if additional customer premises equipment is attached to the identified inside wiring (block 568). Where there are other customer premises equipment connected (block 568), those equipment are disconnected one by one as blocks 548 through 568 are repeated.

Alternatively, where all customer premises equipment are disconnected (block 568) and the dial tone tester still indicates a failure (block 562), an error is indicated in the identified inside wiring (block 582). Otherwise, where no failure is indicated by the dial tone tester (block 562), an error is indicated in the most recently disconnected customer premises equipment (block 574).

Figure 6:
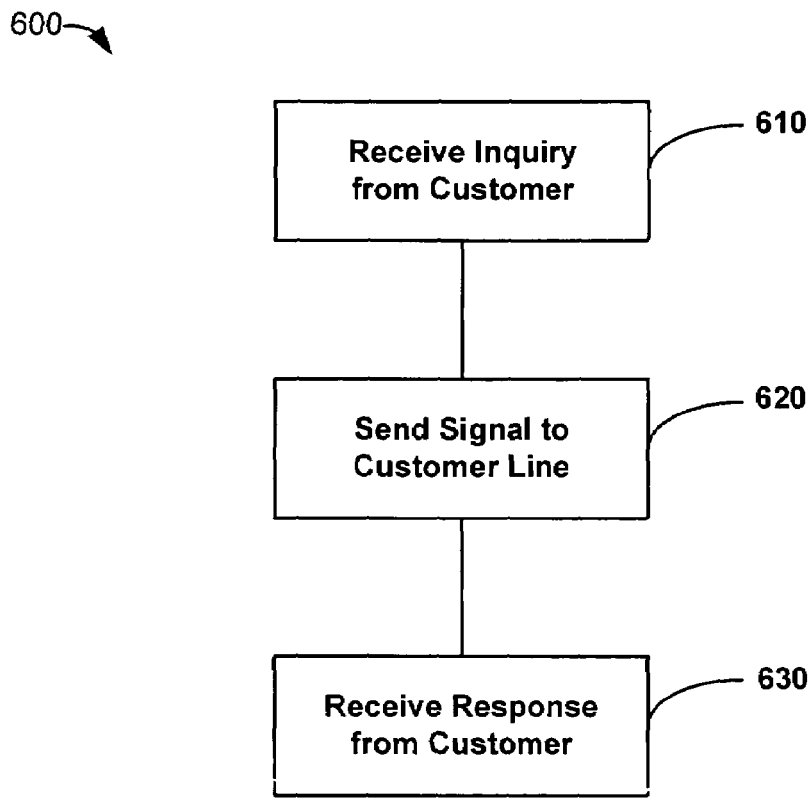
FIG. 6 is a flow diagram of another method for detecting line status in accordance with some embodiments of the present invention.

FIG. 6 is a flow diagram 600 of another method for detecting line status in accordance with some embodiments of the present invention. Following flow diagram 600 central office 210 of a telecommunication service provider receives an inquiry originating from a customer premises (block 610). Then, central office 210 sends a signal to customer premises equipment 130 (block 620). Then, the customer monitors the status of the dial tone tester and responds to central office 210 with the determined status (block 630).

The invention has now been described in detail for purposes of clarity and understanding. However, it will be appreciated that certain changes and modifications may be practiced within the scope of the appended claims. Further, the functions of the systems and methods of using such are merely exemplary. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A system for determining a status of telephone service at a demarcation point, the system comprising:
    a demarcation device associated with a customer premises;
    a dial tone tester integrated with the demarcation device, wherein the integrated dial tone tester includes a visual device, including at least two LEDs, configured to indicate reversed polarity on at least one of a plurality of telephone lines;
    a signal carrier extending from the demarcation device; and
    a connection interface coupled with the signal carrier and operable for attachment to a plurality of inside wiring, wherein the connection interface provides for coupling of the demarcation device with a plurality of customer premises equipment.

2. The system of claim 1, wherein the dial tone tester comprises:
    a voltage dividing circuit, wherein the voltage dividing circuit accepts a signal-in voltage and provides a signal-out voltage.

3. The system of claim 2, wherein the visual device is activated when a threshold voltage on the telephone line is greater than forty-three volts.

4. The system of claim 2, wherein the visual device is deactivated when a threshold voltage on the telephone line is less than forty-four volts.

5. The system of claim 1, wherein the dial tone tester comprises an audible device.

6. The system of claim 5, wherein the dial tone tester is operable to audibly indicate the status of the telephone line.

7. The system of claim 5, wherein the audible device indicates an active status of the telephone line.

8. The system of claim 7, wherein the audible device is activated when a threshold voltage on the telephone line is greater than forty-three volts.

9. The system of claim 7, wherein the audible device is deactivated when a threshold voltage on the telephone line is less than forty-four volts.

10. The system of claim 5, wherein the audible device is a piezoelectric buzzer.

11. A demarcation device, comprising:
    an integrated circuit, wherein the integrated circuit accepts upstream voltage and provides downstream voltage;
    a connection operable to couple the upstream voltage with a telecommunications network;
    a connection interface operable to couple the downstream voltage with a plurality of customer premises equipment;
    a first circuit for communicating information between the integrated circuit and the telecommunications network via the upstream voltage;
    a second circuit for communicating information between the integrated circuit and the customer premises equipment via the downstream voltage; and
    an integrated dial tone tester, wherein the integrated dial tone tester includes a visual indicator, including at least two LEDs, configured to indicate reversed polarity on at least one of a plurality of telephone lines.

12. A method for detecting line status within a customer premises, the steps comprising:
    detecting an absence of a dial tone of a telephone line;
    viewing a demarcation device located at a demarcation location on the customer premises, wherein the demarcation device is integrated with a dial tone tester and is connected to a connection interface, and wherein the dial tone tester includes a visual indicator, including at least two LEDs, configured to indicate reversed polarity on at least one of a plurality of telephone lines;

determining a status from the dial tone tester;

disconnecting one of a plurality of inside wiring from the connection interface; and determining the line status within the customer premises or outside of the customer premises.

13. A method for detecting line status within a customer premises, the steps comprising:

receiving an inquiry originating from a customer premises;

sending a signal to a demarcation device located at the customer premises, wherein the demarcation device is integrated with a dial tone tester and is connected to a connection interface providing for coupling of the demarcation device with a plurality of inside wiring, and wherein the dial tone tester includes a visual indicator, including at least two LEDs, configured to indicate reversed polarity on at least one of a plurality of telephone lines; and receiving a response originating from the customer premises, wherein the response indicates a status of the dial tone tester.

* * * * *